US012337815B2

(12) United States Patent
Books et al.

(10) Patent No.: US 12,337,815 B2
(45) Date of Patent: Jun. 24, 2025

(54) ELECTRIFICATION CONTROL SYSTEMS AND METHODS FOR ELECTRIC VEHICLES

(71) Applicant: Cummins Inc., Columbus, IN (US)

(72) Inventors: Martin T. Books, Columbus, IN (US); Jennifer K. Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 534 days.

(21) Appl. No.: 17/291,852

(22) PCT Filed: Nov. 9, 2018

(86) PCT No.: PCT/US2018/060073
§ 371 (c)(1),
(2) Date: May 6, 2021

(87) PCT Pub. No.: WO2020/096618
PCT Pub. Date: May 14, 2020

(65) Prior Publication Data
US 2022/0009472 A1 Jan. 13, 2022

(51) Int. Cl.
B60W 10/26 (2006.01)
B60W 10/06 (2006.01)
(Continued)

(52) U.S. Cl.
CPC ............ B60W 10/26 (2013.01); B60W 10/08 (2013.01); B60W 20/12 (2016.01); B60W 20/13 (2016.01);
(Continued)

(58) Field of Classification Search
CPC ...... B60W 10/26; B60W 10/08; B60W 20/12; B60W 20/13; B60W 10/06;
(Continued)

(56) References Cited

U.S. PATENT DOCUMENTS 4,566,634 A 1/1986 Wiegand
5,570,841 A 11/1996 Pace et al.
(Continued)

FOREIGN PATENT DOCUMENTS

CN 101519073 A * 9/2009
CN 102717797 A 10/2012
(Continued)

OTHER PUBLICATIONS

Machine Translated CN101519073A (Year: 2009).*
(Continued)

Primary Examiner — Anne Marie Antonucci
Assistant Examiner — Misa H Nguyen
(74) Attorney, Agent, or Firm — Faegre Drinker Biddle & Reath LLP

(57) ABSTRACT

A system is provided for performing an automated electrification operation for an electric vehicle (102) using a processor (122). An electrification controller (126) communicates with a model generation unit (128). The model generation unit (128) generates a model representative of a power consumption trend of the electric vehicle (102). The electrification controller (126) sets a target power margin for the electric vehicle (102) based on the model such that the target power margin is close to a minimum state-of-charge (SOC) threshold of an energy storage supply (124) of the electric vehicle (102). The target power margin represents a difference between the minimum SOC threshold and an ending power level of the energy storage supply (124) after completion of a mission associated with the electric vehicle (102). The processor (122) performs the automated electrification operation for the electric vehicle (102) based on the target power margin.

21 Claims, 3 Drawing Sheets

(51) Int. Cl.
  *B60W 10/08* (2006.01)
  *B60W 20/12* (2016.01)
  *B60W 20/13* (2016.01)
  *B60W 50/00* (2006.01)
(52) U.S. Cl.
  CPC ..... *B60W 10/06* (2013.01); *B60W 2050/0028* (2013.01); *B60W 2050/0088* (2013.01); *B60W 2510/244* (2013.01); *B60W 2510/248* (2013.01); *B60W 2556/45* (2020.02); *B60W 2710/086* (2013.01); *B60W 2710/244* (2013.01)
(58) Field of Classification Search
  CPC . B60W 2050/0028; B60W 2050/0088; B60W 2510/244; B60W 2510/248; B60W 2556/45; B60W 2710/086; B60W 2710/244; B60W 2050/0075; B60W 2552/20; B60W 2556/50; Y02T 10/62; Y02T 10/70
  See application file for complete search history.

(56) References Cited

U.S. PATENT DOCUMENTS

| | | | |
|---|---|---|---|
| 6,285,162 | B1 | 9/2001 | Koo |
| 8,332,342 | B1 | 12/2012 | Saha et al. |
| 9,114,727 | B2 | 8/2015 | Choi et al. |
| 9,499,157 | B2 * | 11/2016 | Muller .................. B60W 10/26 |
| 9,539,912 | B2 | 1/2017 | Li |
| 11,691,518 | B2 * | 7/2023 | Holme ................. G01R 31/382 701/22 |
| 2003/0132320 | A1 | 7/2003 | Sebastian |
| 2003/0184307 | A1 | 10/2003 | Kozlowski et al. |
| 2004/0011895 | A1 | 1/2004 | Dantes et al. |
| 2011/0066308 | A1 | 3/2011 | Yang et al. |
| 2013/0096858 | A1 | 4/2013 | Amano et al. |
| 2013/0158755 | A1 | 6/2013 | Tang et al. |
| 2013/0221741 | A1 | 8/2013 | Stanek et al. |
| 2015/0291145 | A1 | 10/2015 | Yu |
| 2016/0244044 | A1 | 8/2016 | Miller et al. |
| 2017/0242080 | A1 | 8/2017 | La Marca et al. |
| 2017/0261473 | A1 * | 9/2017 | Sung .................. G01N 29/4481 |
| 2018/0095141 | A1 | 4/2018 | Wild et al. |
| 2018/0106868 | A1 * | 4/2018 | Sung ......................... B60L 3/12 |
| 2019/0202306 | A1 * | 7/2019 | Gurin ...................... B60L 53/64 |
| 2020/0198495 | A1 * | 6/2020 | Rizzoni ................. B60W 10/06 |

FOREIGN PATENT DOCUMENTS

| | | |
|---|---|---|
| CN | 103287279 A | 9/2013 |
| CN | 103362712 A | 10/2013 |
| CN | 104973045 A | 10/2015 |
| EP | 0548748 B1 | 6/1993 |
| JP | 2008-024124 A | 2/2008 |
| JP | 2011-211869 A | 10/2011 |
| WO | 2012066242 A1 | 5/2012 |

OTHER PUBLICATIONS

International Preliminary Report on Patentability received for PCT Patent Application No. PCT/US2018/060073, mailed on May 20, 2021, 9 pages.

International Search Report and Written Opinion issued by the ISA/US, Commissioner for Patents, dated Jan. 25, 2019, for International Application No. PCT/US2018/060073; 9 pages.

* cited by examiner

ELECTRIFICATION CONTROL SYSTEMS AND METHODS FOR ELECTRIC VEHICLES

This application is a national phase filing of International Application No. PCT/US2018/060073, filed Nov. 9, 2018, the disclosures of which being expressly incorporated herein by reference.

TECHNICAL FIELD

This disclosure relates generally to methods and systems for controlling electric vehicles, and more particularly to controlling electrification operation of the electric vehicles.

BACKGROUND

A charge-depletion strategy for a battery in an electric vehicle seeks to regulate a minimally-required margin above a minimum state-of-charge (SOC) threshold that needs to be maintained in the battery for proper operation. Specifically, it is desired to maintain the minimally-required margin above the minimum SOC threshold of the battery after completion of a mission for the electric vehicle. When the minimally-required margin is set too high, too much residual electric power is left in the battery after the completion of the mission for the electric vehicle. Conversely, when the minimally-required margin is set too low, too little residual electric power is left to successfully complete the mission for the electric vehicle. Thus, it is beneficial to set the minimally-required margin as close as possible to the minimum SOC threshold of the battery for efficient energy consumption.

An electrification control system can be used to efficiently control the energy consumption of the battery during the mission for the electric vehicle. For example, the electrification control system can be used for both a pure electric vehicle (EV) and/or a hybrid electric vehicle (HEV) having an electric motor and an internal combustion engine (ICE). The electric vehicles, as used herein, refer to the hybrid and/or pure electric vehicles and provide an alternative to conventional fuel engine systems for either supplementing or completely replacing the engine systems, such as the ICEs.

In one example, an alternative vehicle is known as an extended range electric vehicle (EREV). In the EREV, primary electric drive is achieved with a battery or related rechargeable energy storage system (RESS) that acts as a direct current (DC) voltage source to a motor, generator or transmission that in turn can be used to provide the energy needed to rotate one or more of the vehicle's wheels. When the electrical charge from the RESS has been depleted, backup power may come from the ICE to provide auxiliary onboard electrical energy generation.

However, controlling electrification operation of the electric vehicles, e.g., for the EV and HEV, can be challenging due to different energy requirements of each vehicle and various components provided in different electric vehicles. Further, charging time can range from minutes to several hours depending on an extent to which a battery assembly has been depleted and a voltage/frequency of a power outlet. Accordingly, there are opportunities to develop enhanced electrification control systems and methods that can more efficiently control the electrification operation of the electric vehicles.

SUMMARY

In one embodiment of the present disclosure, a system is provided for performing an automated electrification operation for an electric vehicle using a processor. An electrification controller is configured to communicate with a model generation unit. The model generation unit is configured to generate a model representative of a power consumption trend of the electric vehicle. The electrification controller is configured to set a target power margin for the electric vehicle based on the model such that the target power margin is close to a minimum state-of-charge (SOC) threshold of an energy storage supply of the electric vehicle. The target power margin represents a difference between the minimum SOC threshold and an ending power level of the energy storage supply after completion of a mission associated with the electric vehicle. The processor is configured to perform the automated electrification operation for the electric vehicle based on the target power margin.

In one example, the model generation unit is disposed at least partially in a cloud server in communication with the electric vehicle via a network.

In another example, the processor is disposed in the electric vehicle.

In yet another example, the model is a physics-based model generated based on actual data associated with the electric vehicle.

In still another example, the model is a machine-learning model generated based on simulated data associated with the electric vehicle.

In yet still another example, the model is adjusted based on at least one filtering factor. In a variation, the at least one filtering factor is a time-based factor.

In a further example, the model includes aging information of one or more components of the electric vehicle. In a variation, the aging information includes data related to a degree of deterioration of a respective component of the electric vehicle. In another variation, the aging information is used to detect a faulty component of the electric vehicle. In yet another variation, the aging information is used to modify the electrification operation of the electric vehicle.

In another embodiment of the present disclosure, a method is provided for performing an automated electrification operation for an electric vehicle using a processor. The method includes generating a model representative of a power consumption trend of the electric vehicle, setting a target power margin for the electric vehicle based on the model such that the target power margin is close to a minimum state-of-charge (SOC) threshold of an energy storage supply of the electric vehicle, the target power margin representing a difference between the minimum SOC threshold and an ending power level of the energy storage supply after completion of a mission associated with the electric vehicle, and performing the automated electrification operation for the electric vehicle based on the target power margin.

In one example, the method further includes creating a physic-based model based on actual data associated with one or more previous runs of a route assigned to the electric vehicle.

In another example, the method further includes creating a machine-learning model based on simulated data associated with one or more previous runs of a route assigned to the electric vehicle.

In yet another example, the method further includes adjusting the model based on at least one filtering factor or at least one auxiliary factor.

In still another example, the method further includes comparing the target power margin to the minimum SOC threshold of the energy storage supply of the electric vehicle. In a variation, the method further includes modifying the electrification operation of the electric vehicle based on the comparison between the target power margin and the minimum SOC threshold.

In yet another embodiment of the present disclosure, a method is provided for performing an automated electrification operation for an electric vehicle using a processor. The method includes generating a model having aging information of at least one component of the electric vehicle, the model being representative of a power consumption trend of the electric vehicle, setting a target power margin for the electric vehicle based on the model such that the target power margin is close to a minimum state-of-charge (SOC) threshold of an energy storage supply of the electric vehicle, the target power margin representing a difference between the minimum SOC threshold and an ending power level of the energy storage supply after completion of a mission associated with the electric vehicle, and performing the automated electrification operation for the electric vehicle based on the target power margin.

In one example, the method further includes adjusting the model based on one or more vehicle characteristics associated with the electric vehicle.

In another example, the method further includes determining an aging rate of the at least one component of the electric vehicle. In a variation, the method further includes detecting a faulty component of the electric vehicle based on the aging rate. In another variation, the method further includes modifying the electrification operation of the electric vehicle based on the aging rate.

In yet another example, the method further includes setting the target power margin for the electric vehicle within a range between a first percentage limit and a second percentage limit.

In still another example, the method further includes setting the target power margin for the electric vehicle above the minimum SOC threshold by at least a predetermined amount.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1:
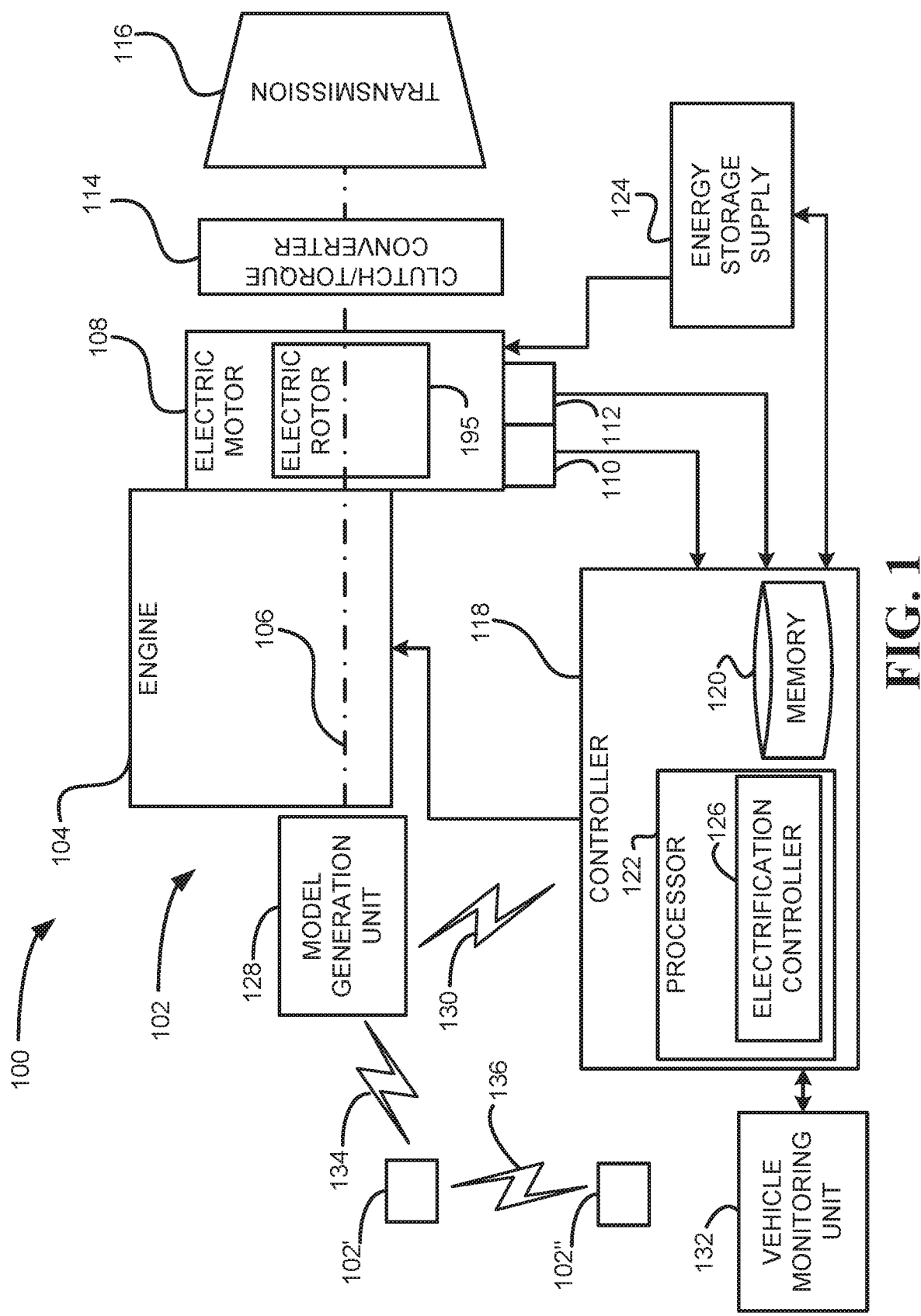
FIG. 1 is a schematic diagram of an engine and electric motor system featuring an electrification controller for electric vehicles in accordance with embodiments of the present disclosure.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

The embodiment disclosed below is not intended to be exhaustive or limit the disclosure to the precise form disclosed in the following detailed description. Rather, the embodiment is chosen and described so that others skilled in the art may utilize its teachings. One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Referring now to FIG. 1, a hybrid system 100 for an electric vehicle 102 is illustrated. For example, electric vehicle 102 can be plugged into an electrical outlet to be connected to a power grid system (not shown) for performing an electrification operation of electric vehicle 102. In various embodiments, the electrification operation may refer to various operations related to electricity generation and electric power distribution and management associated with electric vehicle 102. Exemplary electrification operations include modification of the battery cooling, modification of the charge and/or discharge limits, reducing the number of charging and/or discharging cycles, modification of the minimum state-of-charge threshold, and the like. Electric vehicle 102 may be a commercial vehicle, such as a transit bus, that is connectable to the power grid system.

In one embodiment, the power grid system can be a grid system implemented in a specific commercial facility, such as a bus depot. In another embodiment, the power grid system can be a grid system implemented in a grid network incorporating a plurality of power stations, such as power plants and other power-generating facilities. In FIG. 1, although electric vehicle 102 is depicted as a parallel hybrid system, the present disclosure can also be applied to a range-extended vehicle or a series hybrid vehicle to suit different applications. As such, electric vehicle 102 may be any electric vehicle having an electric propulsion system (e.g., hybrid, pure electric, and/or range-extended vehicles).

Although electric vehicle 102 with an internal combustion engine (ICE) 104 is shown, the present disclosure can be applied to a pure electric vehicle powered by only batteries without engine 104. Engine 104 can be powered by any type of fuel, such as gasoline, diesel, natural gas, liquefied petroleum gases, biofuels, and the like. In this example, hybrid system 100 can include ICE 104 having a crankshaft 106 and a crankshaft sprocket (not shown) coupled to the crankshaft. ICE 104 is not particularly limited and can be on-board (e.g., a range-extended vehicle) or off-board (e.g., a genset located at the bus depot).

Hybrid system 100 can also include an electric motor 108 in mechanical communication with the crankshaft sprocket. For example, electric motor 108 can be a traction motor used for propulsion of electric vehicle 102. In various embodiments, electric motor 108 can be coupled to a speed sensor 110, a torque sensor 112, engine 104, a clutch or torque converter 114, and a transmission 116 via crankshaft 106. In various embodiments, speed sensor 110 and electric motor 108 are in mechanical communication with crankshaft 106. Also, electric motor 108 is not particularly limited and, for example, can be a motor/generator, synchronous motor, or an induction motor.

In embodiments, hybrid system 100 also includes a controller 118 in electrical communication with speed sensor 110 and torque sensor 112 and can include a non-transitory memory 120 having instructions that, in response to execution by a processor 122, cause processor 122 to determine a speed or torque value of electric motor 108. Electric motor 108 electrically receives power from a rechargeable energy storage supply 124, such as a battery pack or assembly, and energy storage supply 124 can provide data representative of state-of-charge (SOC) information to controller 118. Processor 122, non-transitory memory 120, and controller 118 are not particularly limited and can, for example, be physically separate. Additionally, model generation unit 128 and/or vehicle monitoring unit 132 can be included in controller 118 or can be independent units separate from controller 118 to suit different applications.

In certain embodiments, controller 118 can form a portion of a processing subsystem including one or more computing devices having memory, processing, and communication hardware. Controller 118 can be a single device or a distributed device, and functions of controller 118 can be performed by hardware and/or as computer instructions on a non-transient computer readable storage medium, such as non-transitory memory 120.

In certain embodiments, controller 118 includes one or more interpreters, determiners, evaluators, regulators, and/or processors 122 that functionally execute the operations of controller 118. The description herein including interpreters, determiners, evaluators, regulators, and/or processor emphasizes the structural independence of certain aspects of controller 118 and illustrates one grouping of operations and responsibilities of controller 118. Other groupings that execute similar overall operations are understood within the scope of the present disclosure. Interpreters, determiners, evaluators, regulators, and processors can be implemented in hardware and/or as computer instructions on a non-transient computer readable storage medium, and can be distributed across various hardware or computer-based components.

Example and non-limiting implementation elements that functionally execute the operations of controller 118 include sensors, such as speed sensor 110 and torque sensor 112, providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hardwired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret and/or to determine one or more parameters or data structures. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In the illustrated embodiment, processor 122 includes an electrification controller 126 configured to control electrification operation of electric vehicle 102. In this example, electrification controller 126 is included in on-board controller 118 of each electric vehicle 102 in a decentralized way. In another example, electrification controller 126 can be an off-board separate unit implemented in an independent computing device, such as a cloud server, a central server, or a personal mobile device, in a centralized way.

For example, electrification controller 126 can be communicably connected to the central server in a cloud computing network to control the electrification operation of one or more electric vehicles 102. It is advantageous that electrification controller 126 automatically controls a power charge level of energy storage supply 124. Electrification controller 126 is configured to control the electrification operation of electric vehicle 102 such that a power margin is set above a minimum SOC threshold of energy storage supply 124 after completion of a mission of electric vehicle 102. The power margin represents a difference between the minimum SOC threshold and an ending power level of energy storage supply 124 of electric vehicle 102 after the completion of the mission. The minimum SOC threshold of energy storage supply 124 refers to a minimum power level that needs to be maintained in energy storage supply 124 for normal operation of electric vehicle 102.

In one embodiment, electrification controller 126 automatically communicates with a model generation unit 128 via a network 130 to generate a model representative of a power consumption trend of electric vehicle 102 at a particular moment or point in time. For example, model generation unit 128 is configured to generate a model that represents the power consumption trend of electric vehicle 102 in mid-October of a previous year. Based on the model, electrification controller 126 sets the power margin for electric vehicle 102 such that the power margin is as close as possible to the minimum SOC threshold of energy storage supply 124. For example, the power margin can be set above the minimum SOC threshold by at least a predetermined amount (e.g., +5% greater than the minimum SOC threshold). As another example, the power margin can be set within a range between a lower percentage limit (e.g., +1% greater than the minimum SOC threshold) and an upper percentage limit (e.g., +99% greater than the minimum SOC threshold) based on the minimum SOC threshold. In another embodiment, the upper percentage limit can reach a maximum SOC threshold representative of a peak capacity of energy storage supply 124.

In one embodiment, the model can be generated by an on-board processor, such as controller 118. In another embodiment, the model can be generated by an off-board processor disposed in the cloud server via network 130.

In embodiments, model generation unit 128 is configured to generate a model having aging information of one or more components of electric vehicle 102 to calculate the power consumption trend of electric vehicle 102 at a particular moment or point in time. The aging information refers to data related to a degree of deterioration (e.g., an age) of a respective component of electric vehicle 102. Such data can be stored or saved in memory 120 for a predetermined period (e.g., 5-10 years). To determine the degree of deterioration, model generation unit 128 is configured to automatically communicate with a vehicle monitoring unit 132 to determine the aging information of one or more components of electric vehicle 102. For example, vehicle monitoring unit 132 can be a telematics system associated with electric vehicle 102.

In embodiments, vehicle monitoring unit 132 is configured to monitor one or more vehicle characteristics related to electric vehicle 102. For example, vehicle characteristics can include the aging information of one or more components of electric vehicle 102, navigational information based on a satellite navigation system (e.g., a global positioning system), driving experience information related to a specific route for the mission of electric vehicle 102 (e.g., mileage, speed, braking or driving patterns, time of day, weather, road or load conditions, etc.).

In this embodiment, vehicle monitoring unit 132 is configured to record an age of each component of electric vehicle 102 since installation and/or maintenance service on memory 120. For example, the age of electric motor 108 represents the degree of deterioration, but the age can be reset to zero when replaced with a new one. As another example, the age of electric motor 108 can be reset to a predetermined deterioration number after performing a maintenance service on electric motor 108. As such, based on the aging information, electrification controller 126 sets the power margin for electric vehicle 102 such that the power margin is as close as possible to the minimum SOC threshold of energy storage supply 124.

Any type of computer network having a collection of computers, servers, and other hardware interconnected by communication channels is contemplated, such as the Internet, Intranet, Ethernet, LAN, cloud network, etc. In one embodiment, electrification controller 126 interfaces with network 130, such as a wireless communication facility (e.g., a Wi-Fi access point). In another embodiment, network 130 can be a controller area network (e.g., CAN bus) on-board electric vehicle 102. In yet another embodiment, network 130 can be a cloud computing network off-board electric vehicle 102.

Other similar networks known in the art are also contemplated. For example, network 130 can be a cloud network or a vehicle-to-grid (V2G) network 134 between electric vehicle 102' and the power grid system, or a vehicle-to-vehicle (V2V) network 136 between a first electric vehicle 102' and a second electric vehicle 102". In some embodiments, vehicles 102, 102', and 102" are designated collectively as 102 herein to suit different applications. Other suitable arrangements of vehicles 102, 102', and 102" including other multiple vehicles are also contemplated to suit the application. As another example, model generation unit 128 and/or vehicle monitoring unit 132 can be on-board (e.g., in electric vehicle 102) or off-board (e.g., in the cloud network).

Further, electrification controller 126 is configured to determine a power demand level of electric vehicle 102 to satisfy one or more mission requirements for electric vehicle 102. Exemplary mission requirements refer to enabling conditions required for one or more tasks to be performed by electric vehicle 102, such as a battery operational period, a battery life time, a battery state of charge, a number of miles or an area to be covered, and the like. Thus, the electrification operation is automatically controlled by electrification controller 126 based on the power demand level of electric vehicle 102.

Figure 2:
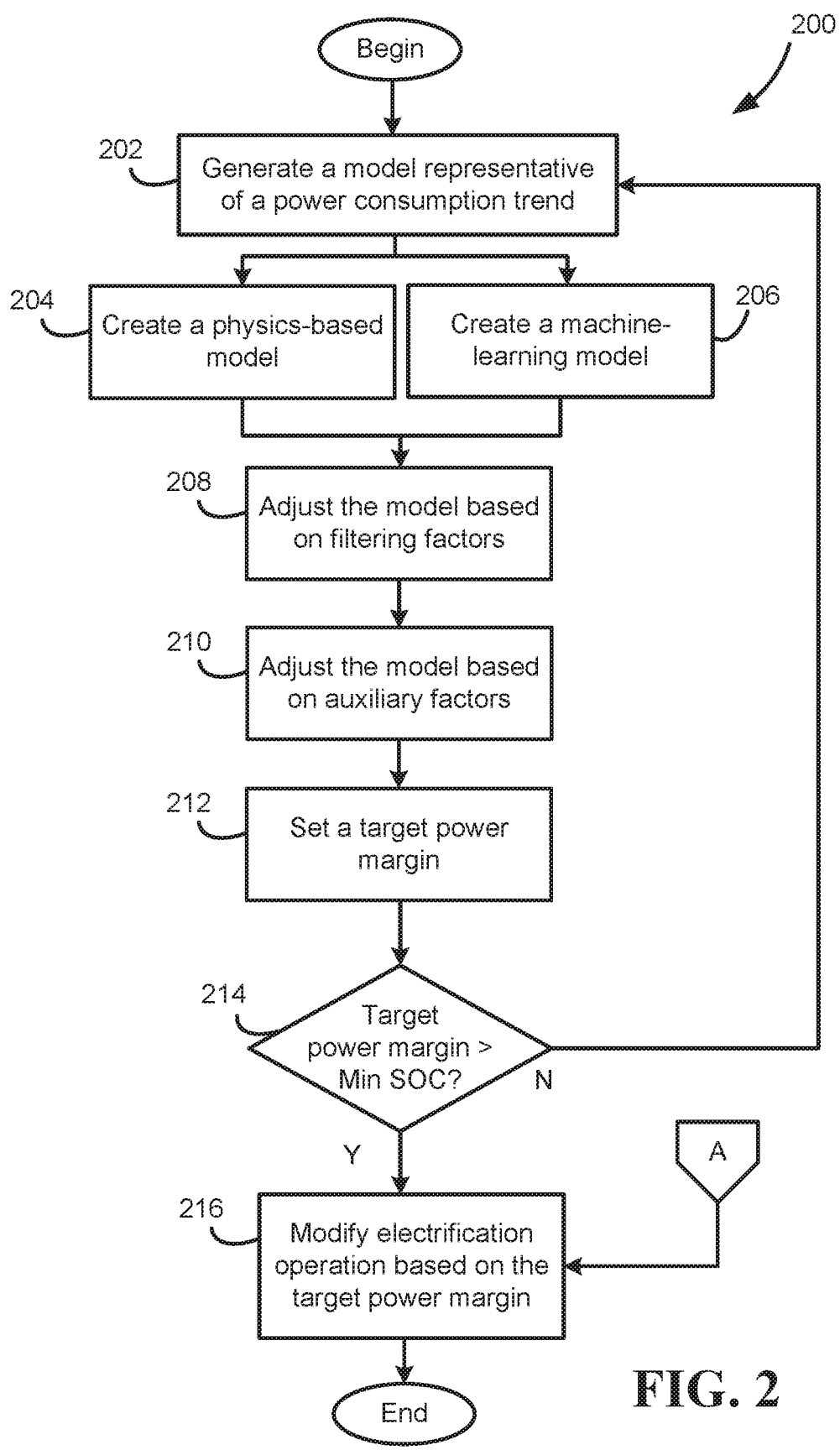
FIG. 2 is a flow chart of an exemplary electrification control method using the electrification controller of FIG. 1 in accordance with embodiments of the present disclosure.

Referring now to FIG. 2, an illustrative electrification operation is shown for electric vehicle 102 in accordance with embodiments of the subject matter disclosed herein. As disclosed herein, hybrid system 100 is not particularly limited and can perform any of the methods described within the scope of this disclosure. In FIG. 2, a method 200 of performing the automated electrification operation is shown using electrification controller 126.

At block 202, electrification controller 126 automatically communicates with model generation unit 128 via network 130 to generate a model representative of a power consumption trend of electric vehicle 102 at a particular moment or point in time. For example, model generation unit 128 models one or more previous runs of a route assigned to electric vehicle 102 and calculates the power consumption trend based on the previous runs of the route.

At block 204, in one embodiment, model generation unit 128 creates a physics-based model based on actual data associated with the one or more previous runs of the route assigned to electric vehicle 102. For example, model generation unit 128 calculates the power consumption trend of electric vehicle 102 in real-time based on the actual data. The actual data can include power consumption information that can be used to predict how much more power is needed for the completion of the mission. Model generation unit 128 calculates the power consumption trend based on the actual data to set the power margin above the minimum SOC threshold of energy storage supply 124 based on the power consumption trend. It is also contemplated that the actual data can include empirical or statistical power consumption information of other electric vehicles 102' and 102" that have the same or similar configuration as electric vehicle 102.

At block 206, in another embodiment, model generation unit 128 creates a machine-learning model based on experimental or simulated data associated with the one or more previous runs of the route assigned to electric vehicle 102. For example, model generation unit 128 calculates the power consumption trend of electric vehicle 102 before, after, and/or during the mission based on the simulated data. The simulated data can include power consumption information that can be used to predict how much more power is needed for the completion of the mission. Model generation unit 128 calculates the power consumption trend based on the simulated data to set the power margin above the minimum SOC threshold of energy storage supply 124 based on the power consumption trend.

Although blocks 204 and 206 are shown separately, both blocks 204 and 206 can be performed simultaneously or sequentially in any order to utilize at least one of the physics-based model and the machine-learning model. Other suitable combinations of the actual data and the simulated data are also contemplated to suit various applications.

At block 208, model generation unit 128 adjusts the model based on one or more filtering factors. For example, model generation unit 128 filters out or removes at least a portion of the actual and/or simulated data associated with the one or more previous runs of the route assigned to electric vehicle 102 based on the one or more filtering factors. In embodiments, the model is adjusted using the filtered actual and/or simulated data. An exemplary filtering factor includes a time-based factor related to a time period or a specific moment in time (e.g., a timestamp) that the actual and/or simulated data have been collected or retrieved from electric vehicle 102.

More specifically, the time-based factor can relate to before, after, and/or during a specific event (e.g., a road construction). Other time-based factors include a time of the day, a day of the week (e.g., weekend or weekdays), and the like. Further, seasonal factors such as ambient weather conditions (e.g., temperature, wind, etc.) can also be included in the filtering factors. For example, since a heating, ventilation, and air conditioning (HVAC) system can affect the power consumption trend of electric vehicle 102 during summer or winter weather, model generation unit 128 adjusts the model using the actual and/or simulated data relevant to the corresponding weather conditions. As discussed above, vehicle monitoring unit 132 can provide weather-related information.

In another embodiment, the relevant actual and/or simulated data can be filtered by model generation unit 128 before generating the model. In yet another embodiment, the relevant actual and/or simulated data can be filtered by model generation unit 128 in real-time while the model is being generated by model generation unit 128. In still another embodiment, the relevant actual and/or simulated data can be filtered by model generation unit 128 after generating the model for subsequent or future use.

At block 210, model generation unit 128 adjusts the model based on one or more auxiliary factors. The auxiliary factors refer to one or more conditions that can affect a current power consumption trend of electric vehicle 102. Exemplary auxiliary factors include a driving habit of an operator of electric vehicle 102, a road configuration (e.g., rough or paved), a current time (e.g., operating at 2 am versus 5 pm), a traffic condition, a road condition (e.g. uphill v. downhill, or rough v. paved), a load condition (e.g., partially loaded v. fully loaded, or load weight), a power need (e.g., based on scheduled, historical, or future needs), and the like.

In another embodiment, additional auxiliary factors for each electric vehicle 102 can further include a road grade (e.g., 15-degree uphill), weather-related information (e.g., based on telematics, empirical, historical, and/or simulation data), a mission status (e.g., a degree of completion of the mission, such as 10% or 90% complete), a load criticality (e.g., refrigerated v. nonperishable food), and the like. Other suitable eco-systems of electric vehicles (e.g., a fan or temperature control) are also contemplated to suit different applications. Each factor can be adjusted or affected by one or more of the rest of factors described above.

In yet another embodiment, additional auxiliary factors can also include an amount of charge needed for the mission, a time period available for the mission, a current and/or future operating condition (e.g., a battery temperature), an anticipated mission time length or power needs for the next mission, data or information of other electric vehicles relating to the electrification operation (e.g., data or information shared between electric vehicles 102 via the V2V network), a power load level required for non-electric vehicle applications (e.g., an air conditioner or an HVAC system associated with electric vehicle 102), and the like. Each factor can be adjusted or affected by one or more of the rest of factors.

In embodiments, the factors can be determined or calculated based on data received from one or more sensors (e.g., GPS sensors, temperature sensors, state-of-charge sensors, weight/load sensors, etc.), vehicle control units (e.g., engine control unit/module, or eco-system control units, etc.), and user input devices. Other suitable sensors and devices, such as information storage systems, are also contemplated to suit the application. As such, it will be apparent to one skilled in the relevant art(s) with the benefit of this disclosure how to determine or calculate the factors in various embodiments.

At block 212, electrification controller 126 sets a target power margin for electric vehicle 102 based on the model generated (or adjusted in block 208 and/or 210 if necessary) by model generation unit 128 such that the target power margin is as close as possible to the minimum SOC threshold of energy storage supply 124 after the completion of the mission. In one example, the target power margin can be higher or lower than a current power margin associated with electric vehicle 102. In another example, the target power margin can be the same as the current power margin associated with electric vehicle 102.

In one embodiment, the current power margin refers to a default power margin associated with electric vehicle 102, and the target power margin refers to a future power margin that electric vehicle 102 will have at the end of the mission. Electrification controller 126 performs the automated electrification operation of electric vehicle 102 based on the target power margin. Exemplary electrification operation is described below in paragraphs relating to FIGS. 2 and 3.

At block 214, when the target power margin is greater than the minimum SOC threshold of energy storage supply 124, control proceeds to block 216. Otherwise, control returns to block 202, but in other embodiments, control can return to any of blocks 202-210 to suit different applications.

At block 216, electrification controller 126 modifies the electrification operation of electric vehicle 102 based on the target power margin. For example, electrification controller 126 modifies a current power margin of electric vehicle 102, a cooling scheme of electric vehicle 102 (e.g., to cool the battery faster), or a charging/discharging scheme of energy storage supply 124. For example, if the target power margin is greater than the current power margin by a predetermined value, energy storage supply 124 is charged longer (e.g., up to 100% of capacity) during the next charging cycle. Conversely, if the target power margin is less than the current power margin by a predetermined value, energy storage supply 124 is charged shorter (e.g., up to 80% of capacity) during the next charging cycle.

Figure 3:
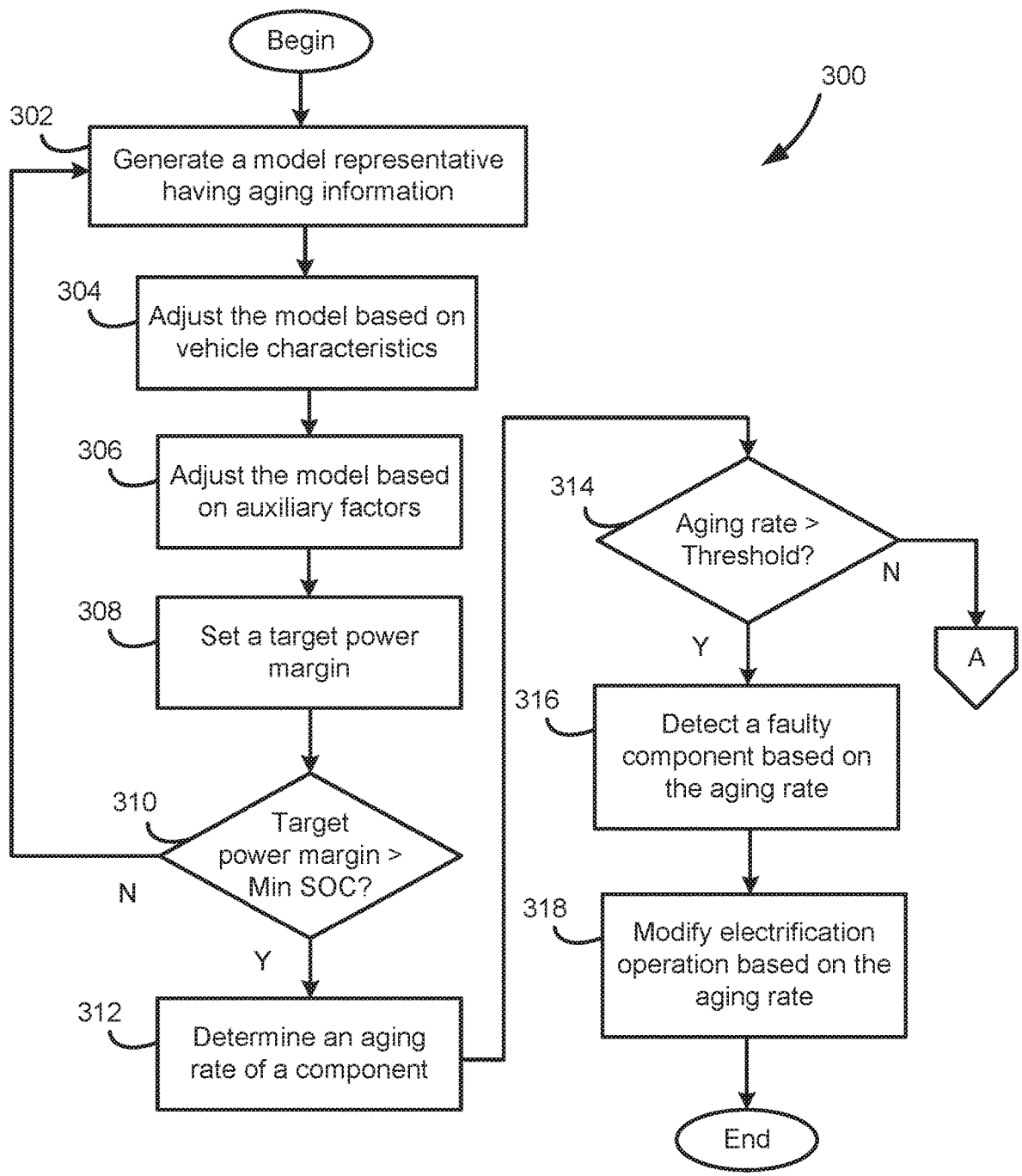
FIG. 3 is a flow chart of another exemplary electrification control method using the electrification controller of FIG. 1 in accordance with embodiments of the present disclosure.

Referring now to FIG. 3, another illustrative electrification operation is shown for electric vehicle 102 in accordance with embodiments of the subject matter disclosed herein. As disclosed herein, hybrid system 100 is not particularly limited and can perform any of the methods described within the scope of this disclosure. In FIG. 3, a method 300 of performing the automated electrification operation is shown using electrification controller 126.

At block 302, electrification controller 126 automatically communicates with model generation unit 128 via network 130 to generate a model having aging information of one or more components of electric vehicle 102 to calculate the power consumption trend of electric vehicle 102 at a particular moment or point in time. Exemplary components of electric vehicle 102 can include energy storage supply 124 (e.g., a battery), electric motor 108, ICE 104, a generator (not shown), a drivetrain or powertrain (e.g., a crankshaft), a drive axle assembly (not shown), and the like.

For example, model generation unit 128 models the aging information of one or more components of electric vehicle 102 and calculates the power consumption trend based on the aging information. As an example only, between a new electric motor and an old electric motor installed in electric vehicle 102, the old electric motor is likely to drain more electric power from energy storage supply 124 than the new electric motor. In terms of an efficiency of electric motor 108 in general, the old electric motor may require more electric power than the new electric motor to perform the same mechanical movement needed for electric vehicle 102. As such, the power consumption trend can vary depending on the aging information of electric motor 108. As discussed above with reference to blocks 204 and 206 of FIG. 2, the model can be a physics-based model or a machine-learning model to suit the application.

At block 304, model generation unit 128 adjusts the model based on one or more vehicle characteristics associated with electric vehicle 102. For example, the vehicle characteristics can include the aging information of one or more components of electric vehicle 102, navigational information based on a GPS system, driving experience information related to a specific route for the mission of electric vehicle 102 (e.g., mileage, speed, braking or driving patterns, time of day, weather, road or load conditions, etc.).

At block 306, model generation unit 128 adjusts the model based on one or more auxiliary factors. The auxiliary factors refer to one or more conditions that can affect a current power consumption trend of electric vehicle 102. Exemplary auxiliary factors include a driving habit of an operator of electric vehicle 102, a road configuration (e.g., rough or paved), a current time (e.g., operating at 2 am versus 5 pm), a traffic condition, a road condition (e.g. uphill v. downhill, or rough v. paved), a load condition (e.g., partially loaded v. fully loaded, or load weight), a power need (e.g., based on scheduled, historical, or future needs), and the like. Other suitable auxiliary factors discussed in FIG. 2 are also contemplated to suit the application.

At block 308, electrification controller 126 sets a target power margin for electric vehicle 102 based on the model generated (or adjusted in block 304 and/or 306 if necessary) by model generation unit 128 such that the target power margin is as close as possible to the minimum SOC threshold of energy storage supply 124 after the completion of the mission. In one example, the target power margin can be higher or lower than a current power margin associated with electric vehicle 102. In another example, the target power margin can be the same as the current power margin associated with electric vehicle 102. In one embodiment, the current power margin refers to a default power margin associated with electric vehicle 102, and the target power margin refers to a future power margin that electric vehicle 102 will have at the end of the mission.

At block 310, when the target power margin is greater than the minimum SOC threshold of energy storage supply 124, control proceeds to block 312. Otherwise, control returns to block 302, but in other embodiments, control can return to any of blocks 302-306 to suit different applications.

At block 312, electrification controller 126 determines an aging rate of a corresponding component of electric vehicle 102 using vehicle monitoring unit 132. In embodiments, the aging rate can be a part of the aging information associated with a degree of deterioration of a respective component of electric vehicle 102. For example, the aging rate represents how fast the respective component is deteriorating or aging over a predetermined period. In one embodiment, vehicle monitoring unit 132 calculates the aging rate of the respective component of electric vehicle 102 based on at least one of: telematics, empirical, actual, historical, and/or simulation data. Electrification controller 126 communicates with vehicle monitoring unit 132 to retrieve the aging rate. Although block 312 is shown as a next step after block 310, block 312 can be performed as an independent step separate from blocks 302-310 to suit different applications.

At block 314, when the aging rate is greater than a predetermined threshold (e.g., greater than 5%), control proceeds to block 316. Otherwise, control returns to block 216 of FIG. 2. In embodiments, a normal aging rate of a component of electric vehicle 102 can range approximately between 2-5% per year. However, for example, when the aging rate of electric motor 108 in the current year is greater than the aging rate of last year by more than 5%, electrification controller 126 determines that electric motor 108 is abnormally aging more quickly than expected. As another example, when the aging rate of electric motor 108 in electric vehicle 102 is greater than the aging rate of similar electric vehicles 102' and 102" by the predetermined threshold, electrification controller 126 determines that electric motor 108 of electric vehicle 102 is abnormally aging.

At block 316, electrification controller 126 detects a faulty component of electric vehicle 102 based on the aging rate and flags the faulty component for issuing a subsequent warning or message to the operator or other systems of electric vehicle 102. For example, when electrification controller 126 determines that an abnormal aging rate of the respective component of electric vehicle 102 has been detected, electrification controller 126 can generate one or more diagnostic codes or messages, such as On-Board-Diagnostic (OBD) trouble codes.

In another embodiment, electrification controller 126 generates a warning or information message for the operator or other systems associated with electric vehicles 102 based on the detection of the abnormal aging rate. For example, the warning or information message can be displayed on a dashboard display of electric vehicle 102, and any information relating to the aging information can also be displayed or transmitted to other systems associated with electric vehicle 102. Other suitable visual or audible signals, such as a check engine light, are also contemplated to suit different applications.

At block 318, electrification controller 126 modifies the electrification operation of electric vehicle 102 based on the aging rate. For example, when a faster aging rate than normal is detected based on historical data, electrification controller 126 can perform the charging operation of energy storage supply 124 for a longer period to compensate for the faster aging rate. As another example, electrification controller 126 can modify a battery cooling parameter for a cooling system associated with electric vehicle 102, a charging and/or discharging limit associated with energy storage supply 124, and/or a number of charging and/or discharging cycles associated with energy storage supply 124.

It should be understood that, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Various modifications and additions can be made to the exemplary embodiments discussed without departing from the scope of the presently disclosed subject matter. For example, while the embodiments described above refer to particular features, the scope of this disclosure also includes embodiments having different combinations of features and embodiments that do not include all of the described features. Accordingly, the scope of the subject matter disclosed herein is intended to embrace all such alternatives, modifications, and variations as fall within the scope of the claims, together with all equivalents thereof.

What is claimed is:

1. A system for performing an automated electrification operation for an electric vehicle using a processor, comprising:
    an electrification controller configured to communicate with a model generation unit;
    the model generation unit configured to generate a model representative of a power consumption trend of the electric vehicle;
    the electrification controller configured to set a target power margin for the electric vehicle based on the model such that the target power margin is close to a minimum state-of charge (SOC) threshold of an energy storage supply of the electric vehicle, the minimum SOC threshold representing a minimum power level of the energy storage supply to be maintained for normal operation of the electric vehicle, and the target power margin representing a difference between the minimum SOC threshold and an ending power level of the energy storage supply after completion of a mission associated with the electric vehicle, the mission including a route of the electric vehicle,
    wherein the processor is configured to perform the automated electrification operation for the electric vehicle based on the target power margin,
    wherein the model is generated based on data associated with one or more previous runs of the route of the electric vehicle,
    wherein the model includes aging information of one or more components of the electric vehicle,
    wherein the aging information comprises an age of a component of the one or more components of the electric vehicle, and
    wherein the age is determined based on maintenance information of the component.

2. The system of claim 1, wherein the model generation unit is disposed at least partially in a cloud server in communication with the electric vehicle via a network.

3. The system of claim 1, wherein the processor is disposed in the electric vehicle.

4. The system of claim 1, wherein the model is adjusted based on at least one filtering factor.

5. The system of claim 4, wherein the at least one filtering factor is a time-based factor.

6. The system of claim 1, wherein the aging information includes data related to a degree of deterioration of a respective component of the electric vehicle.

7. The system of claim 1, wherein the aging information is used to detect a faulty component of the electric vehicle.

8. The system of claim 1, wherein the aging information is used to modify the automated electrification operation of the electric vehicle.

9. The system of claim 1, wherein:
    the component comprises an electric motor, and
    the maintenance information comprises a maintenance service on the electric motor or a replacement of the electric motor.

10. A method of performing an automated electrification operation for an electric vehicle using a processor, the method comprising:
    generating a model representative of a power consumption trend of the electric vehicle, the power consumption trend based on aging information of one or more components of the electric vehicle;
    setting a target power margin for the electric vehicle based on the model such that the target power margin is close to a minimum state-of-charge (SOC) threshold of an energy storage supply of the electric vehicle, the minimum SOC threshold representing a minimum power level of the energy storage supply to be maintained for normal operation of the electric vehicle, and the target power margin representing a difference between the minimum SOC threshold and an ending power level of the energy storage supply after completion of a mission associated with the electric vehicle the mission including a route of the electric vehicle,
    wherein the model is generated based on data associated with one or more previous runs of the route of the electric vehicle;
    performing the automated electrification operation for the electric vehicle based on the target power margin;
    wherein the aging information comprises an age of a component of the one or more components of the electric vehicle, and
    wherein the age is based on maintenance information of the component.

11. The method of claim 10, wherein the model is a machine-learning model based on simulated data associated with the one or more previous runs of the route of the electric vehicle.

12. The method of claim 10, further comprising adjusting the model based on at least one filtering factor or at least one auxiliary factor.

13. The method of claim 10, further comprising comparing the target power margin to the minimum SOC threshold of the energy storage supply of the electric vehicle.

14. The method of claim 13, further comprising modifying the automated electrification operation of the electric vehicle based on the comparing the target power margin to the minimum SOC threshold.

15. A method of performing an automated electrification operation for an electric vehicle using a processor, the method comprising:
generating a model having aging information of at least one component of the electric vehicle, the model being representative of a power consumption trend of the electric vehicle, the aging information including an age of a first component of the at least one component of the electric vehicle, wherein the age is based on maintenance information of the first component;
setting a target power margin for the electric vehicle based on the model such that the target power margin is close to a minimum state-of-charge (SOC) threshold of an energy storage supply of the electric vehicle, the minimum SOC threshold representing a minimum power level of the energy storage supply to be maintained for normal operation of the electric vehicle, and the target power margin representing a difference between the minimum SOC threshold and an ending power level of the energy storage supply after completion of a mission associated with the electric vehicle, the mission including a route of the electric vehicle,
wherein the model is generated based on data associated with one or more previous runs of the route of the electric vehicle; and
performing the automated electrification operation for the electric vehicle based on the target power margin.

16. The method of claim 15, further comprising adjusting the model based on one or more vehicle characteristics associated with the electric vehicle.

17. The method of claim 15, further comprising determining an aging rate of a second component of the at least one component of the electric vehicle.

18. The method of claim 17, further comprising detecting a faulty component of the electric vehicle based on the aging rate.

19. The method of claim 15, further comprising modifying the automated electrification operation of the electric vehicle based on the aging information.

20. The method of claim 15, further comprising setting the target power margin for the electric vehicle within a range between a first percentage limit and a second percentage limit.

21. The method of claim 15, further comprising setting the target power margin for the electric vehicle above the minimum SOC threshold by at least a predetermined amount.

* * * * *